United States Patent
Edwards

(10) Patent No.: US 10,209,057 B2
(45) Date of Patent: Feb. 19, 2019

(54) APPARATUS TO REDUCE PRESSURE AND THERMAL SENSITIVITY OF HIGH PRECISION OPTICAL DISPLACEMENT SENSORS

(71) Applicant: BAKER HUGHES INCORPORATED, Houston, TX (US)

(72) Inventor: Carl M. Edwards, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/370,767

(22) Filed: Dec. 6, 2016

(65) Prior Publication Data

US 2017/0082422 A1    Mar. 23, 2017

Related U.S. Application Data

(63) Continuation of application No. 14/066,524, filed on Oct. 29, 2013, now Pat. No. 9,513,145.

(51) Int. Cl.
*G01B 9/02* (2006.01)
*G01D 5/34* (2006.01)
(Continued)

(52) U.S. Cl.
CPC ........ *G01B 9/02067* (2013.01); *E21B 47/011* (2013.01); *E21B 49/00* (2013.01);
(Continued)

(58) Field of Classification Search
CPC .. G01B 9/02067; G01B 2290/25; G01V 8/00; G01V 8/10; G01V 8/12; G01V 8/14;
(Continued)

(56) References Cited

U.S. PATENT DOCUMENTS 4,765,741 A * 8/1988 Detro .................. G03F 7/70716
356/500
4,768,182 A    8/1988 Hatfield
(Continued)

FOREIGN PATENT DOCUMENTS

WO    2008014416 A2    1/2008

OTHER PUBLICATIONS

ISR and Written Opinion in PCT/US2014/062449 dated Oct. 27, 2014.

*Primary Examiner* — Michael A Lyons
(74) *Attorney, Agent, or Firm* — Mossman, Kumar & Tyler, PC

(57) ABSTRACT

Methods, systems and devices for estimating a parameter of interest in a borehole. The method may include generating information from an optical displacement device relating to relative motion between two or more reflective surfaces thereof that is indicative of the parameter of interest; and preventing changes in the information resulting from changes at the optical displacement device in at least one of i) temperature, or ii) pressure, by compensating for the changes. Compensating may include adjusting at least one light source generating an electromagnetic beam at least partly received by the optical displacement device responsive to information relating to a control optical displacement device at the optical displacement device. Compensating may include using an optical displacement device and configuring the optical displacement device such that a difference between a first variable gap and a second variable gap is substantially zero while the apparatus is subject to nominal conditions.

15 Claims, 7 Drawing Sheets

(51) Int. Cl.
    *E21B 47/01*   (2012.01)
    *E21B 49/00*   (2006.01)
    *G01D 5/26*    (2006.01)
    *G01V 11/00*   (2006.01)

(52) U.S. Cl.
    CPC ..... *G01B 9/02052* (2013.01); *G01B 9/02075* (2013.01); *G01D 5/266* (2013.01); *G01D 5/34* (2013.01); *G01B 2290/25* (2013.01); *G01V 11/00* (2013.01)

(58) Field of Classification Search
    CPC ... G01V 8/16; G01V 8/20; G01V 8/22; G01D 5/266; G01D 5/34; E21B 47/011; E21B 47/06; E21B 47/065; E21B 47/123
    See application file for complete search history.

(56) References Cited

U.S. PATENT DOCUMENTS

| | | | |
|---|---|---|---|
| 4,815,855 A | 3/1989 | Dixon | |
| 4,983,824 A | 1/1991 | Saaski et al. | |
| 5,125,743 A | 6/1992 | Rust et al. | |
| 5,127,731 A * | 7/1992 | DeGroot | H01S 5/0687 356/486 |
| 5,276,501 A * | 1/1994 | McClintock | G01D 5/266 250/227.19 |
| 6,097,478 A | 8/2000 | Berthold et al. | |
| 6,481,286 B1 | 11/2002 | Bernstein et al. | |
| 6,563,593 B2 | 5/2003 | Hill | |
| 6,884,981 B2 | 4/2005 | Proksch et al. | |
| 7,355,723 B2 | 4/2008 | Carr et al. | |
| 7,362,422 B2 | 4/2008 | DiFoggio et al. | |
| 7,495,775 B2 | 2/2009 | Carr | |
| 7,554,674 B2 | 6/2009 | Carr | |
| 7,583,390 B2 | 9/2009 | Carr | |
| 7,626,707 B2 | 12/2009 | Carr | |
| 7,751,064 B2 | 7/2010 | Liesener et al. | |
| 7,812,311 B2 | 10/2010 | DeCamp et al. | |
| 7,894,618 B2 | 2/2011 | Carr | |
| 8,007,609 B2 | 8/2011 | Carr et al. | |
| 8,717,580 B2 | 5/2014 | Carr | |
| 8,797,548 B2 | 8/2014 | Edwards et al. | |
| 9,513,145 B2 | 12/2016 | Edwards et al. | |
| 2005/0050962 A1 | 3/2005 | Zerwekh et al. | |
| 2005/0088660 A1* | 4/2005 | Ronnekleiv | G01B 9/02007 356/478 |
| 2009/0091765 A1* | 4/2009 | Chow | G01B 9/02004 356/477 |
| 2009/0109423 A1 | 4/2009 | Carr | |
| 2009/0109445 A1 | 4/2009 | Carr et al. | |
| 2009/0268211 A1 | 10/2009 | Carr et al. | |
| 2010/0025112 A1 | 2/2010 | Sroka et al. | |
| 2010/0046002 A1 | 2/2010 | Perez et al. | |
| 2010/0123895 A1* | 5/2010 | Reiner | G01S 7/484 356/5.01 |
| 2011/0172959 A1* | 7/2011 | Childers | G01D 5/268 702/179 |
| 2011/0196636 A1 | 8/2011 | Edwards | |
| 2012/0099114 A1 | 4/2012 | Carr et al. | |
| 2012/0212745 A1 | 8/2012 | Edwards et al. | |
| 2012/0271549 A1 | 10/2012 | Edwards et al. | |
| 2013/0087328 A1 | 4/2013 | Maida, Jr. et al. | |
| 2013/0191030 A1 | 7/2013 | Edwards et al. | |
| 2014/0165720 A1 | 6/2014 | Edwards et al. | |

* cited by examiner

US 10,209,057 B2

APPARATUS TO REDUCE PRESSURE AND THERMAL SENSITIVITY OF HIGH PRECISION OPTICAL DISPLACEMENT SENSORS

CROSS-REFERENCE TO RELATED APPLICATION

This application is a continuation of application Ser. No. 14/066,524 filed Oct. 29, 2013, now U.S. Pat. No. 9,513,145 issued Dec. 6, 2016, which is incorporated herein by reference in its entirety.

FIELD OF THE DISCLOSURE

In one aspect, this disclosure generally relates methods and apparatuses for sensing displacement optically.

BACKGROUND

Displacement sensors, such as microphones and pressure sensors, are well-known. Many displacement sensors may be based on one or more of electrical capacitance, electrical impedance, or magnetic fields. These electrical and magnetic based displacement sensors may be limited due to one or more of: low sensitivity, the need for high-voltage biasing, poor electrical isolation, environmental factors, and response nonlinearities. These limitations may require a close coupling between transducer design and the sensor mechanical design, which may limit performance and the operational size of the displacement sensor. Optical displacement sensors, such as displacement sensors using an etalon, may be electrically and magnetically insensitive, which may mitigate limitations found in electrical and magnetic based displacement sensors.

SUMMARY OF THE DISCLOSURE

In aspects, the present disclosure is related to an apparatus and method for estimating a parameter of interest using values of a beam property from at least one electromagnetic beam that pass through at least part of an optical displacement device.

One embodiment according to the present disclosure includes an apparatus for estimating a parameter of interest, comprising: an optical displacement sensor comprising: an optical displacement device configured to receive at least one electromagnetic beam, the optical displacement device comprising: a first reflective surface; a second reflective surface; a third reflective surface fixed with respect to the second reflective surface; a fourth reflective surface fixed with respect to the first reflective surface; a first variable gap between the first reflective surface and the second reflective surface; and a second variable gap between the third reflective surface and the fourth reflective surface; and at least one detector array configured to receive a part of the at least one electromagnetic beam.

A relative motion between the first reflective surface and the second reflective surface and a relative motion between the third reflective surface and the fourth reflective surface may each be indicative of the parameter of interest. The optical displacement device may comprise a middle member comprising the second reflective surface and the third reflective surface. The middle member may comprise a proof mass. The proof mass may be opaque. The optical displacement device may comprise an outer member comprising the first reflective surface and the fourth reflective surface. The outer member may comprise a proof mass. The optical displacement device may be configured such that the difference between the first variable gap and the second variable gap is substantially zero while the apparatus is subject to nominal conditions. Nominal conditions may include at least one of: i) reference gravity; ii) zero force; iii) zero acceleration; iv) zero pressure. The at least one electromagnetic beam may comprise a plurality of electromagnetic beams. The apparatus may be configured to direct a first electromagnetic beam towards the first variable gap and a second electromagnetic beam towards the second variable gap.

Another embodiment according to the present disclosure includes an apparatus for estimating a parameter of interest, comprising: an optical displacement sensor comprising: at least one light source configured to generate at least one initial electromagnetic beam; an optical displacement device configured to receive at least one electromagnetic beam comprising at least a portion of the initial electromagnetic beam; at least one detector configured to receive a part of the at least one electromagnetic beam received by the optical displacement device and provide information relating to the parameter of interest; and a closed loop light source control comprising an optical component at the optical displacement device, the closed loop light source control configured to compensate for changes in temperature at the optical displacement device by adjusting the at least one light source.

The apparatus may include a housing enclosing the optical displacement device and the optical component. The housing may be environmentally sealed. The housing may maintain a vacuum inside the housing. The optical component may include a beam splitter configured to divide the at least one initial electromagnetic beam into the at least one electromagnetic beam and at least one second electromagnetic beam; and a control optical displacement device configured to receive the at least one second electromagnetic beam. The apparatus may include at least one detector optically coupled to the optical component and configured to receive a part of the at least one second electromagnetic beam; and control electronics operatively coupled to the at least one detector and the at least one light source and configured to provide closed loop control of the at least one light source using information from the at least one detector.

Another embodiment according to the present disclosure includes a method for estimating a parameter of interest in an earth formation intersected by a borehole. The method may include conveying an optical displacement device in the borehole; generating information from the optical displacement device relating to relative motion between two or more reflective surfaces of the optical displacement device that is indicative of the parameter of interest; and preventing changes in the information resulting from changes at the optical displacement device in at least one of i) temperature, or ii) pressure, by compensating for the changes at the optical displacement device. Compensating may include adjusting at least one light source generating an electromagnetic beam at least partly received by the optical displacement device, the adjusting responsive to information relating to a control optical displacement device at the optical displacement device. Compensating may include using an optical displacement device comprising: a first reflective surface; a second reflective surface; a third reflective surface fixed with respect to the second reflective surface; a fourth reflective surface fixed with respect to the first reflective surface; a first variable gap between the first reflective surface and the second reflective surface; and a second variable gap between the third reflective surface and the fourth reflective surface; and configuring the optical displacement device such that the difference between the first variable gap and the second variable gap is substantially zero while the apparatus is subject to nominal conditions.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
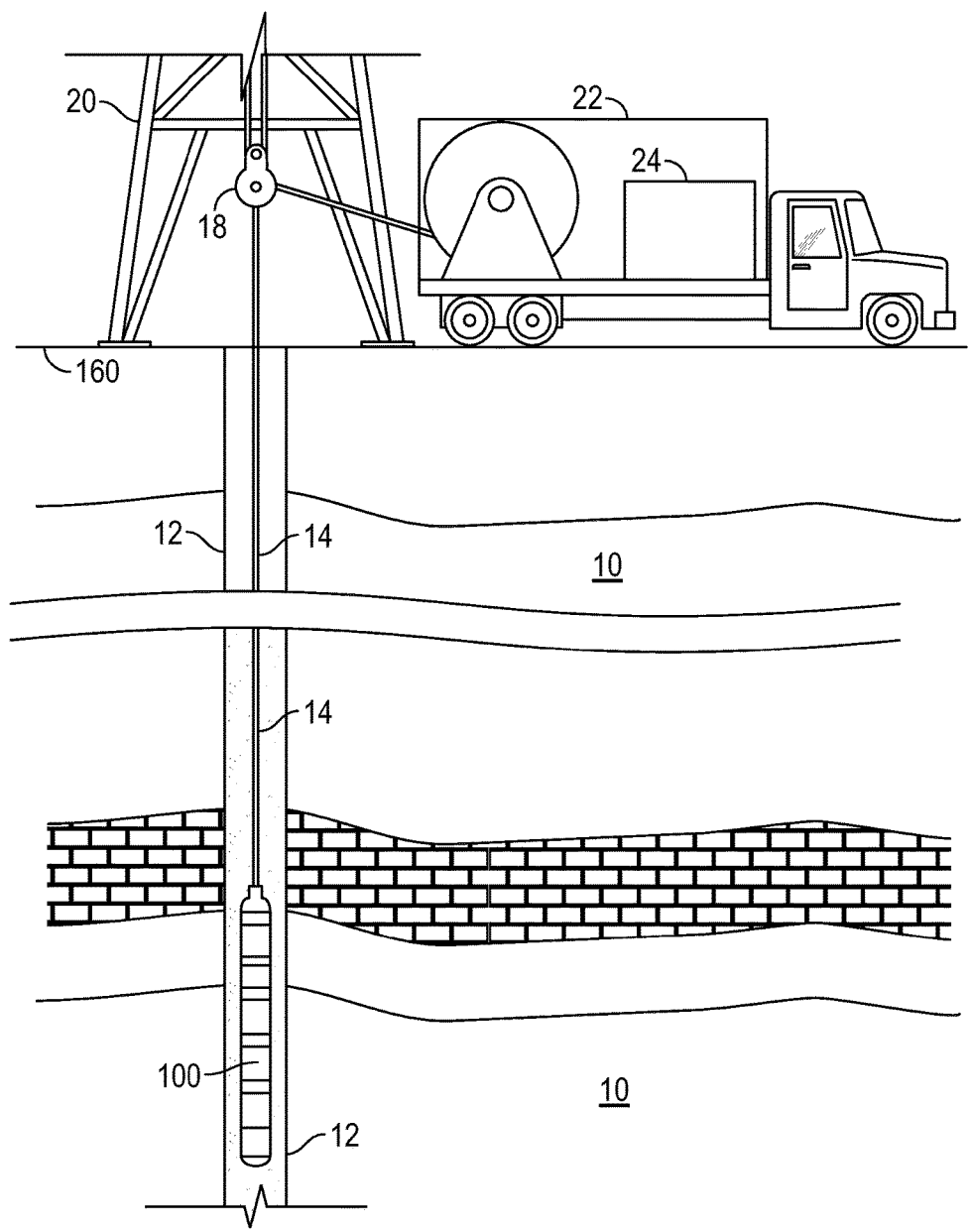
FIG. 1 shows an optical displacement device deployed along a wireline according to one embodiment of the present disclosure.

The present disclosure relates to devices and methods for estimating a parameter of interest with an optical displacement device using techniques for preventing changes in the information generated in the optical displacement device resulting from temperature or pressure changes at the optical displacement device. These techniques may include compensating for the changes at the optical displacement device.

Aspects of the present disclosure include a dual-cavity optical displacement device. In traditional gravimeters, the cavity length may fluctuate with temperature, producing an offset term which is accounted for in measurement calculations. By using a common member to support a reflective surface for each respective cavity on opposing sides, measurements from the two devices may be related to one another, such that effects of temperature changes on one cavity cancel the effects of the temperature changes on the other cavity. The cavities of the dual-cavity gravimeter may be designed to be of equal length when the force on the proof-mass is zero. Thus, the difference in cavity lengths may be used as the relevant offset term, which may be configured to be substantially zero. The member may be used as a proof mass. Some embodiments use reflection only for both cavities. In this case, the mirrors attached to the proof-mass spring assembly can be totally reflective, allowing increased mass for the proof mass. This may improve the sensor's sensitivity to proof-mass displacement by increasing the finesse of both cavities.

Aspects of the present disclosure include maintaining a light source control element (e.g., a control etalon) in the same environment as an optical displacement device used to sense information related to the parameter of interest (e.g., a sensor etalon). Optical displacement sensors use a light source that is separated from the sensor by a sufficient distance that it is subject to different pressure and temperature fluctuations. As a result, fluctuations in its wavelength caused by environmental factors are uncorrelated with sensor parameters and appear as a noise source. With a laser light source locked to the physical dimensions of an etalon, the fluctuations are primarily caused by changes in the index-of-refraction of the material between the etalon's mirrors and by changes in length of the cavity. These changes can also occur in the displacement sensor's cavity. By housing critical components of the laser system with components of the displacement sensor, the laser's locking etalon and the sensor's cavity experience the same environment so that changes in the index of refraction and dimensions of the laser's locking etalon are correlated with the same changes in the sensor's cavity. In this configuration, the thermal coefficients of the laser's etalon may act to oppose the thermal coefficients of the sensor; compensating for the sensor's thermal sensitivity.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows one embodiment according to the present disclosure wherein a cross-section of a subterranean formation 10 in which is drilled a borehole 12 is schematically represented. Suspended within the borehole 12 at the bottom end of a carrier such as a wireline 14 is a device or tool 100. The tool 100 may include processor. The wireline 14 may be carried over a pulley 18 supported by a derrick 20. Wireline deployment and retrieval is performed by a powered winch carried by a service truck 22, for example. A control panel 24 interconnected to the tool 100 through the wireline 14 by conventional means controls transmission of electrical power, data/command signals, and also provides control over operation of the components in the device 100. Use of a non-rigid carrier to convey tool 100 is exemplary only. Tool 100 may also be conveyed by a rigid carrier. In some embodiments, the borehole 12 may be utilized to recover hydrocarbons. In other embodiments, the borehole 12 may be used for geothermal applications, water production, mining, tunnel construction, or other uses.

In embodiments, the device 100 may be configured to collect information regarding force or acceleration. The device may also be configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), nuclear magnetic resonance sensors (for determining the porosity and other petrophysical characteristics of the formation), and gravimeters/gravity gradiometers (for estimating formation density). Other exemplary devices may include gyroscopes, magnetometers, accelerometers, and sensors that collect formation fluid samples and determine the properties of the formation fluid, which include physical properties and chemical properties.

Device 100 may be conveyed to a position in operable communication or proximity with a parameter of interest. In some embodiments, device 100 maybe conveyed into a borehole 12. The parameter of interest may include, but is not limited to, one of: (i) pressure, (ii) force, and (iii) acceleration. Depending on the operating principle of the device 100, the device 100 may be configured to operate under surface and borehole conditions. The ambient temperature in the borehole may exceed 120 degrees Celsius (248 degrees Fahrenheit). In other embodiments, a device 100 may be used at the surface 160.

Device 100 includes an optical displacement sensor in accordance with embodiments of the present disclosure. Optical-displacement sensors operate by detecting light reflected by an optical element that changes its reflectivity as a result of displacement (e.g., change in position over time) of a member in response to an environmental stimulus, such as pressure differential, sound, vibration, etc. The detected light may be converted into an electrical signal. This signal may be a function of the reflectivity of the optical element, and, therefore, a function of the stimulus as well. Optical displacement sensor may include an optical interferometer.

Optical interferometers have been proven to have outstanding resolution when used as displacement detectors in physical sensing components, such as microphones, pressure sensors, and accelerometers. One exemplary optical interferometer is the Fabry-Perot interferometer, which is also known as an etalon. An etalon may include an optically resonant cavity that distributes optical energy of an input light signal into a reflected signal and a transmitted signal. The ratio of optical energy in the reflected and transmitted signals may depend on the cavity length of the optically resonant cavity, which is the spacing between its two, substantially-parallel, partially reflective surfaces and its operating wavelength, x, (i.e., the wavelength, x, of the light on which the interferometer operates).

In an etalon, light can be strongly modulated by very small changes in the cavity length, and these changes can be detected using standard optical detection approaches that result in a wide dynamic range. The use of light beam for the readout is very different from the more standard approaches that use charged particles, including electrostatic, capacitive, piezoelectric, or piezoresistive techniques. All of these technologies require a close coupling between the transducer design and the sensor mechanical design. This results in constraints on the sensor that affect the performance adversely, especially as the size is reduced. An etalon-based displacement sensor having high dynamic range and high sensitivity may have many advantages in the field of physical sensing including reduction in size of the optical interferometer transducer and not adversely interacting with the optical interference transducer. This independence between the etalon and the optical interference transducer may result in the benefit of a decoupling of the transducer and the sensor design.

An etalon may be configured to be sensitive to a force or acceleration stimulus by having one surface of the etalon operably connected to a surface of, or disposed on, a movable element. When the element moves in response to the stimulus, the cavity length changes and, therefore, so does the ratio of optical energy in the reflected and transmitted signals. As a result, an electrical output signal based on one of the reflected and transmitted signals may be a function of the stimulus incident on the etalon.

The basic operating principal involves the creation of an optical path whose length is varied when subjected to an external stimulus, such as pressure or acceleration. An etalon may be used for consideration of the design issues in these types of transducers in general. This type of interferometer may have two parallel dielectric mirrors that bound an empty cavity. Light that is incident upon the cavity will be partially transmitted according to the formula:

$$T = \frac{1}{\left(1 + F\sin^2\frac{\varphi}{2}\right)^2}, \quad (1)$$

wherein F (finesse) is determined by the reflectance of the two mirrors, $$F = \frac{4R_0}{(1 - R_0)^2}, \quad (2)$$

wherein $R_0$ is the reflectance of the mirrors. Herein, it is assumed that the reflectance values of the two mirrors are equal. $\varphi = 4\pi nd \cos\theta/\lambda$ is the phase that is picked up in a wave with wavelength $\lambda$ as it makes a roundtrip within the cavity of length d and index of refraction n with angle of incidence $\theta$.

Figure 2:
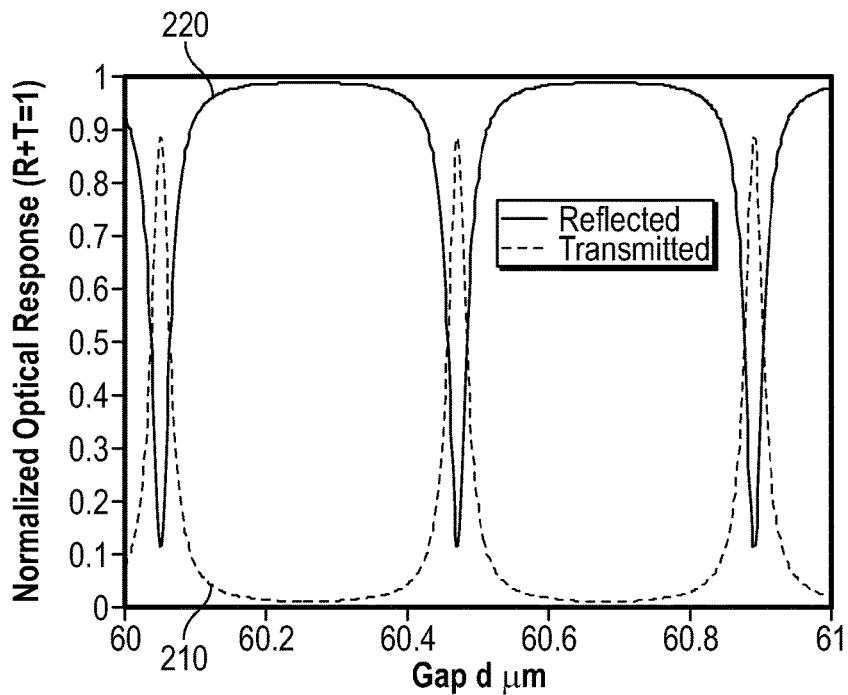
FIG. 2 shows a graph of reflected and transmitted light in a Fabry-Perot interferometer according to the present disclosure.

A typical response is shown in FIG. 2, where a transmitted wave 210 is reflected as reflected wave 220. The rate of change of the optical signal may be on the order of several percent per nanometer of motion. The optical signal can be resolved at a level below 100 parts per billion (ppb), which translates to the ability of the transducer to detect femtometer-scale changes in the displacement of one mirror relative to the other mirror. However, the sensitivity of the transducer may be very low throughout most of the typical operating points as can be seen in curves 210 and 220. Sensitivity of the transducer may be proportional to the absolute value of the slope of curves 210 and 220. So it may be observed that the slope, and sensitivity, may be very low when the gap d is between about 60.2 micrometers and 60.4 micrometers, and the slope may observed to be higher between about 60.4 micrometers and 60.6 micrometers.

A high resolution sensor may require that the optical cavity length be allowed to vary over many wavelengths. One way to maintain sensitivity over a wide range of cavity lengths is to use multiple beams of light where each beam has a different response to changes in cavity length. The multiple beams of light may exhibit different responses by having different wavelengths, different angles of incidence, or a combination thereof.

Figure 3:
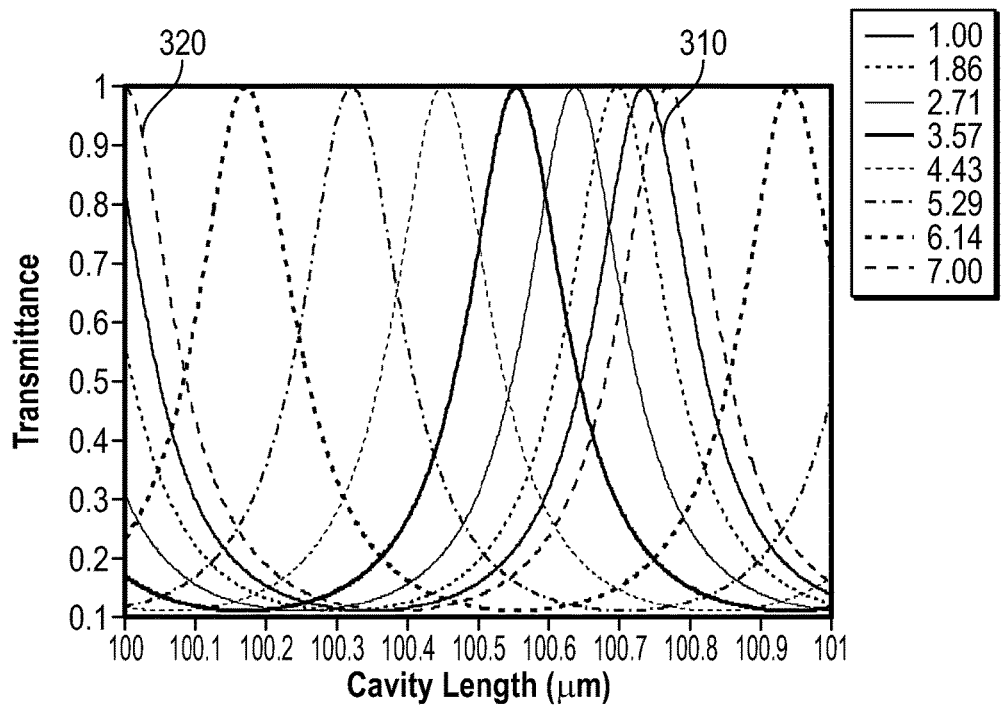
FIG. 3 shows a graph of optical responses to a range of incident angles of light in the Fabry-Perot interferometer according to the present disclosure.

FIG. 3 shows a chart of curves representing multiple beams on light using an exemplary set of different angles of incidence. The angles of incidence in this example range from 1.00 degrees in curve 310 to 7.00 degrees in curve 320. This range of angles is exemplary and illustrative only, and other ranges of angles may be used as would be understood by one of skill in the art with the benefit of the present disclosure. It may be seen from these curves that more than one beam may be sensitive to a particular cavity length. These beams may be produced using techniques known to those of skill in the art, including, but not limited to, one or more of: (i) directing multiple light beams toward a single lens configured to operate in a pupil division mode and (ii) directing multiple light beams toward an individual lenslets corresponding to each of the multiple light beams.

Figure 4:
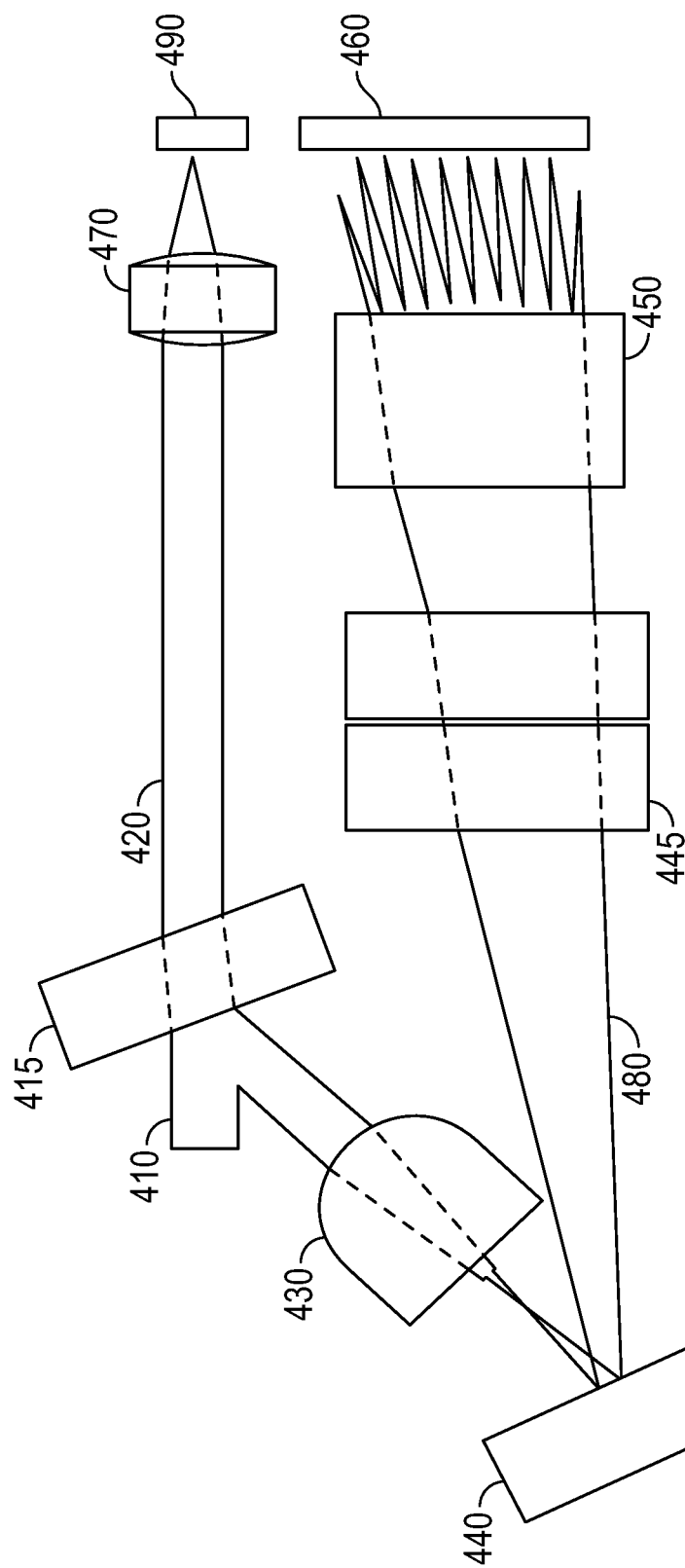
FIG. 4 shows a schematic of an optical displacement apparatus according to one embodiment of the present disclosure.

FIG. 4 shows a schematic of one embodiment according to the present disclosure. The coherent light beam 410, which may be collimated and/or polarized, may be split by a beam splitter 415 to generate a reference signal 420. A cylindrical condenser lens 430 spreads the beam 410 into divergent beams 480 in the far field. The input tilt mirror 440 sets the mean angle of incidence through the etalon 445. In some embodiments, the mean angle may range from about 0 degrees to about $\theta_{max}$ degrees, where:

$$\theta_{max} < \frac{w}{2d_{max}k_0}; \quad (3)$$

w=width of beam;
$k_0 = 100R(2+R)(1-R^2)^{-1}$; and
R=Reflectivity of etalon surfaces It may be understood by one of skill in the art with the benefit of the present disclosure that the mean angle may range from about 0 degrees to an angle of such magnitude as causes the light beam to degrade such that the light beam may no longer interfere with itself. The light beams 480, each with its own angle of incidence, may be partially transmitted through the etalon 445 and may be collimated before reaching a detector array 460 by a collimator lens 450. The number of angles of the light beams may vary with the finesse of the etalon 445. Finesse is a parameter characterizing an optical cavity and may be a function of the reflectivity of the mirrored surfaces of the etalon 445, herein defined by eqn. (2). Generally, a higher reflectivity may result in a higher degree of finesse and the higher the number of angles of the light beams that may be required in the etalon 445. The detector array 460 may include two or more light sensitive detectors, such as photodiodes. In this exemplary embodiment, the detector array 460 includes nine (9) detectors with a spot size of each detector at about 10 micrometers and an array spacing of about 575 micrometers. Detector array 460 may distribute the detectors linearly. Detector array 460 may include at least one detector for each of the light beams 480. The detector array 460 may be configured to generate electrical signals in response to receiving energy from the light beams 480. The collimator lens 450 may include a lens array with a plurality of lenses. Condenser lens 470 may focus light beam 410 on a reference detector 490. The light beam 410 may be of any wavelength (infra-red, visible, ultraviolet, etc.) as long as the corresponding lenses, detectors, and etalon are configured and/or selected to properly respond to the wavelength used. In some embodiments, a second light beam (not shown) at a different wavelength from light beam 410 may be used along with light beam 410.

Figure 5:
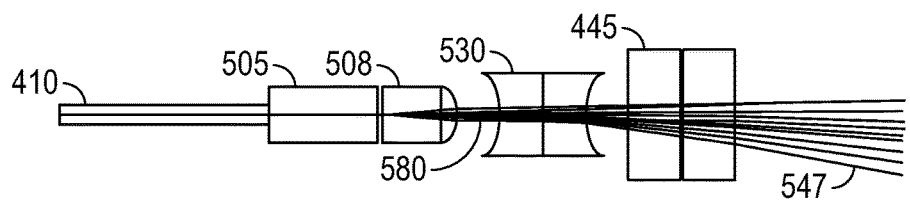
FIG. 5 shows a schematic of the divergent light beams produced in another optical displacement apparatus according to one embodiment of the present disclosure.
Figure 6:
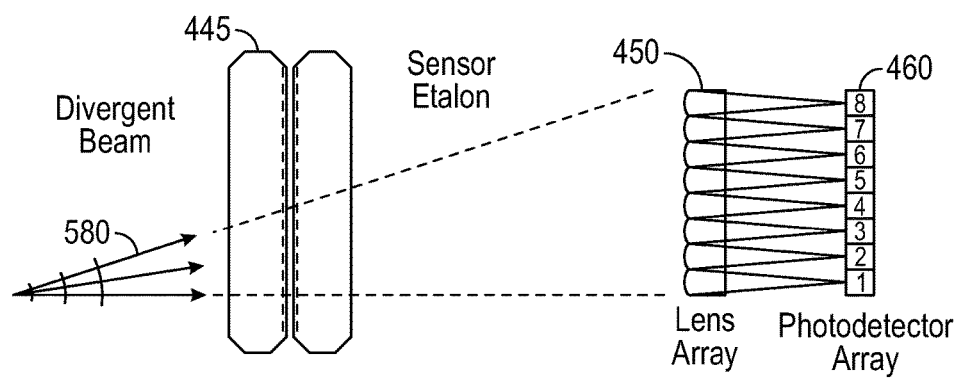
FIG. 6 shows a schematic of the interferometer and detection array of an optical displacement apparatus according to one embodiment of the present disclosure.

FIGS. 5 & 6 show a schematic of another embodiment according to the present disclosure. Here, coherent light beam 410 passes though a collimator lens 505 and polarizer 508 to a lens 530 that may change the incoming beam 410 into beams 580. Lens 530 may be configured to cause incoming beam 410 to diverge or converge. The beams 580 enter an etalon 445, where part of each of the beams 547 is transmitted to a lens array 450. Lens 530 is shown as a pair of concave cylindrical lenses, however, this is exemplary and illustrative only, as lens 530 may also be a single concave lens, a single convex lens, or a pair of convex lenses. Beams 580 may be divergent or convergent. The lens array 450 focuses the beams on a detector array 460. In some embodiments, a single lens (not shown) may be used in addition to or instead of the lens array 450. In some embodiments, an optical grating (not shown) may be used in addition to or instead of lens 530. The detector array 460 may be configured to generate electrical signals in response to receiving energy from the light beams 580. While there is no reference beam shown, a reference beam may be added to increase sensitivity for some applications. The reference beam may be used to cancel noise caused by intensity variations of the incoming light beam 410. The use of an optional reference beam may be determined by expertise of those of skill in the art.

In other embodiments, a coherent light beam from a fiber optic source may naturally spread to form divergent beams that may pass through an etalon to a custom lens, including for example, off-axis Fresnel zones that may transfer the incident energy of the light beam from each ring-shaped zone and direct it to an individual detector in a detector array. The detector array may include at least two detectors (which may form a linear array) responsive to electromagnetic energy and generate electrical signals in response to receiving energy from the light beams. In some examples, the array may be a two-dimensional array, which may include a charge coupled device (CCD) such as the type used in digital cameras.

Figure 7A:
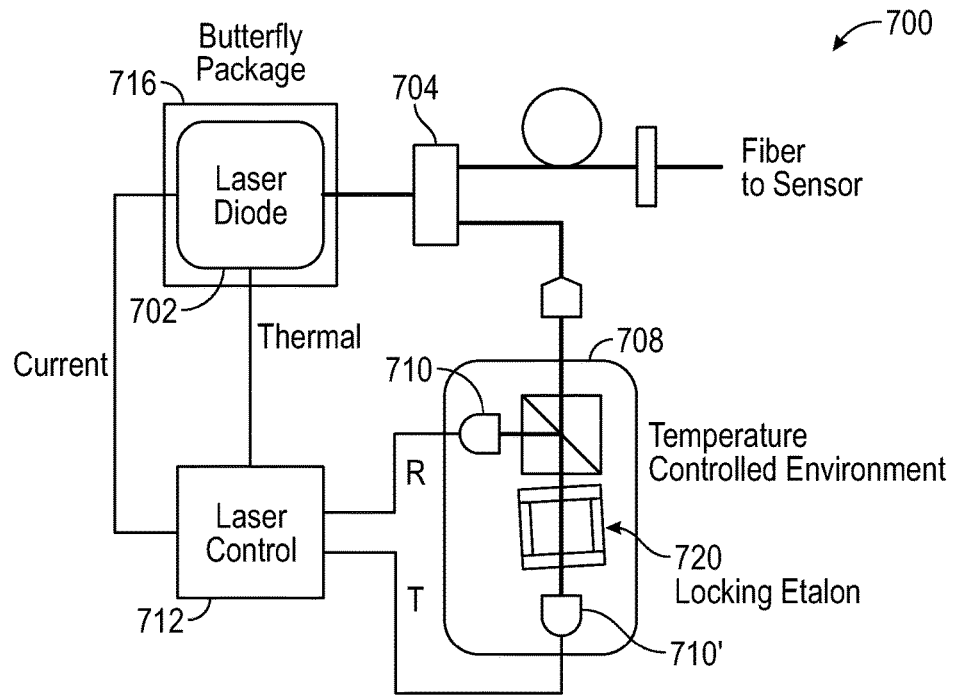
FIGS. 7A and 7B show another example optical displacement sensor with a locked wavelength light source.
Figure 7B:
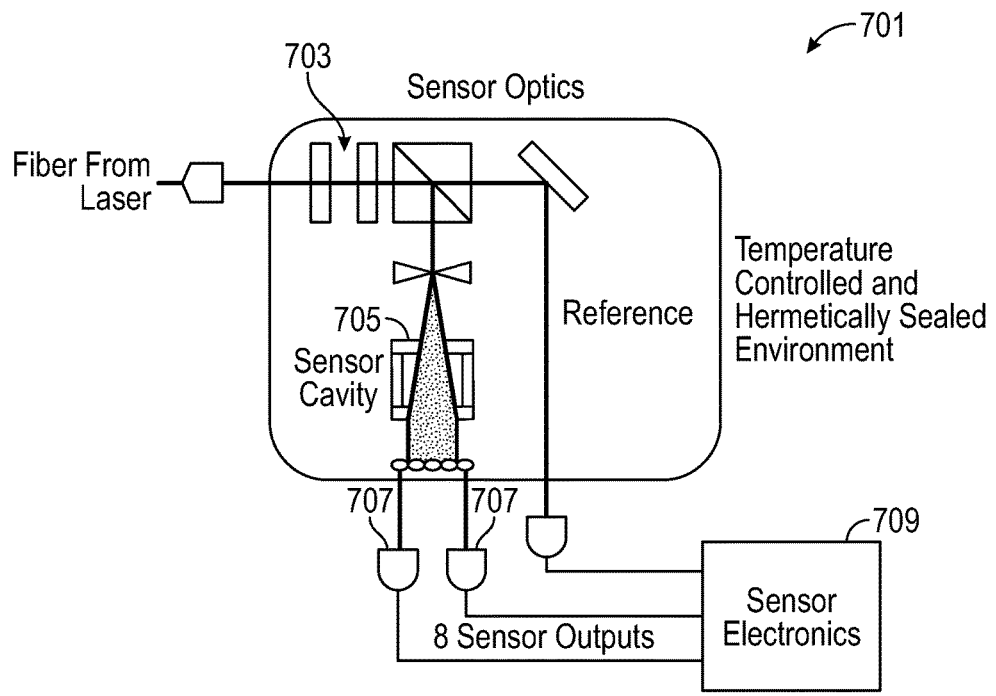

FIGS. 7A and 7B show another example optical displacement sensor with a locked wavelength light source. The optical displacement device 700 (FIG. 7A) includes a light source 702 having its wavelength controlled using an optical control component. For example, the device 700 may employ the closed loop light source control to lock the light source to the length of a high finesse temperature controlled etalon. FIG. 7A shows a light source module. FIG. 7B shows a sensor module. The optical displacement sensor includes the light source and sensor as separate modules, coupled by a polarization maintaining optical fiber to transfer light to the sensor module. Each module contains an interferometer, such as an etalon. The etalon in the light source module (FIG. 7A) is used to lock the wavelength of the laser diode to its length and supply the sensor (FIG. 7B) with light at a constant wavelength. Its etalon responds to outside forces by displacing one or both of its mirrors.

Referring to FIG. 7A, the light source module 700 contains a number of free space optical components including a laser diode 702, an isolator, and a closed loop light source control. The closed loop light source control includes an optical control component (locking etalon 720), one or more detectors (photodiode 710') optically coupled to the optical control component, and control electronics (laser control module 712) operatively coupled to the at least one detector and laser diode 702. Light source module 700 also includes a thermoelectric cooler ('TEC') 716 to regulate the temperature of the laser diode 702.

The light source module 700 is configured so that the output electromagnetic beam ('light') is coupled into a fiber, which in turn is coupled to a fiber splitter. The fiber splitter is configured to send a portion (e.g., 90 percent) of the light out to the sensor module 701 and another portion (10 percent) to the locking etalon 720. Inside thermally controlled environment 708, the light propagates in free space to/from/through the locking etalon 720. Locking etalon 720 is hermetically sealed and slightly canted to minimize issues arising from stray and unwanted reflectance.

Those skilled in the art, will recognize that the locking etalon could be replaced by a gas cell containing a gas with an optical adsorption line at the wavelength required of the sensor. In this case, the laser would be locked to the wavelength of the adsorption line. A gas that is typically used for wavelengths near 1550 nm is methane. In this case, the laser is locked to one of the rotational adsorption lines of the methane molecule. Those skilled in the art could select different gases for different wavelengths. However, using a gas cell will not compensate for thermal and index of refraction affects inside the sensor etalon.

FIG. 7B includes an optical displacement sensor 701, which may be implemented according to various embodiments as described herein or employ various combinations of elements and components thereof. The light from the laser enters through a fiber and then propagates in free space inside the sensor's temperature controlled environment.

As illustrated in FIG. 7B, the optical displacement sensor 701 includes sensor optics 703, detectors 707, and an optical displacement device (sensor etalon 705). Sensor etalon (or measurement etalon) 705 is configured to estimate the parameter of interest. Sensor optics 703 divide the beam into a reference beam and a beam introduced to the sensor cavity of etalon 705. The optics are configured to send the reference beam to a photodiode to serve as an intensity reference.

In the figure, the beam is shown as expanding through the cavity with a focal point distant from the cavity. It could equally well be focused into the cavity with a focal point at the cavity's center. Once the beam has exited the cavity, eight fractions of it are collected and focused on an array of sensors, e.g., photodiodes 707. The response of the photodiodes 707 is received by sensor electronics 709, which may include one or more processors, along with the reference signal. From there it is processed to yield a value for the optical phase of each beam, as described above.

The etalon in the laser and the etalon in the sensor cavity may be in separate hermetically sealed housings and regulated to separate temperatures. The optical fiber between the two modules may cross a significant distance separating the modules.

Returning to FIG. 7A, in operation, laser control module 712 locks the wavelength of the light source 702 to the length of a high finesse temperature controlled etalon. The index of refraction will change because of atmospheric changes as well as with temperature and composition of the gas. The temperature is controlled to limit thermal changes in dimension.

Responsive to light received, photodiodes 710, 710' send signals representing information indicative of the respective light received to laser control module 712. Thus, photodiodes 710, 710' in cooperation with laser control module 712 measure the amount of reflected (R) and transmitted (T) light. The difference (R−T) is used to lock the wavelength of the laser diode to the side of an etalon fringe. For example, the wavelength may be about 1550 nm.

The locking occurs by detecting the light reflecting from and passing through the etalon. The transmitted light is given by $$T = \frac{I_0}{1 + F\sin^2\delta/2}; \quad (4)$$

$I_0$ is the intensity of the transmitted light; F is the finesse factor of the cavity; and δ is the optical phase of the light in the cavity. The optical phase is $$\delta = \frac{2\pi v}{v_{FSR,L}}; \quad (5)$$

$$v_{FSR,L} = \frac{c}{2d_L n_L \cos\theta_L};$$

$V_{FSR,L}$ is the free spectral range of the cavity; c is the speed of light $d_L$ is the length of the cavity; $n_L$ is the index-of-refraction for the media in the cavity; and $\theta_L$ is the light beam's angle of incidence to the cavity. Assuming an ideal cavity, reflected light is given by $$R = I_0 - T = I_0\left(1 - \frac{1}{1 + F\sin^2\delta/2}\right) \quad (6)$$

$$= I_0\left(\frac{F\sin^2\delta/2}{1 + F\sin^2\delta/2}\right).$$

To lock the wavelength, a small offset current is applied that is proportional to R−T. This is equivalent to locking at T=R=½. In that case, the optical phase must satisfy $$F\sin^2\delta/2 = 1. \quad (7)$$

The stable light source wavelength and frequency must satisfy $$v = v_{FSR,L}\left(m \pm \frac{1}{\pi}\sin^{-1}\left(\frac{1}{\sqrt{F}}\right)\right) \equiv \alpha v_{FSR,L} \quad (8)$$

Whether the ± sign is applicable depends on which side of the fringe the light source is locked to. Here m is an integer and is about 7740 for a 6 mm cavity and a nominal wavelength of 1550 nm. For a high finesse factor of 100, then inverse sine is about 0.1. The important point is that the frequency of the locked laser is proportional to the free spectral range of the cavity. It means that it is also proportional to the index-of-refraction of the media in the cavity and its length.

The sensor receives the input light from the light source. The input light passes through an etalon where one of the mirrors is attached to a proof mass and spring and we measure the transmitted light. Assuming perfect light measurement (ignoring for the moment the use of the reference beam to remove relative intensity noise from the measurement), the signal obtained is given by eqn. (4), but the free spectral range depends on the sensor cavity.

The transmitted signal from any given channel of the sensor is then given by $$S = \frac{I_{C0}}{1 + F_C \sin^2 \delta_C/2}; \quad (9)$$

where S is the signal; $I_{C0}$ is the incident intensity; $F_C$ is the finesse of the cavity and $\delta C$ is the optical phase of the light through the cavity. Referring to the optical phase, $$\delta_C = \frac{2\pi v}{v_{FSR,C}}; \quad (10)$$

$$v_{FSR,C} = \frac{c}{2(x_C - x)n_C \cos\theta_C}.$$

Here the subscript C indicates the variables of associated with the sensor cavity and $x_C$ is the length of the cavity under zero force on the proof mass. The proof-mass moves a distance x, under the force of gravity. As is readily apparent, $$x = \frac{mg}{k}, \quad (11)$$

where m is the mass of the proof-mass and spring assembly; g is the gravitational acceleration; and k is the spring constant. Substituting the light frequency from a locked light source yields $$\delta_C = \frac{2\pi\alpha v_{FSR,L}}{v_{FSR,C}}. \quad (12)$$

Applying the expressions for the laser's free spectral range and the cavity's free spectral range, we find $$\delta_C = 2\pi\alpha \frac{(x_C \pm x)n_C \cos\theta_C}{d_L n_L \cos\theta_L}. \quad (13)$$

The ± sign depends on the orientation of the cavity with respect to gravity. All of the parameters of this equation (with the exception of α) can be temperature dependent.

The displacement of the proof-mass is dependent upon the gravitational force and the spring constant of the spring. The spring constant depends on the mechanical dimensions of the spring and its elastic constants. The thermal constants of dimensions and elastic constants act in a way such that the effects counteract. If the temperature fluctuations are sufficiently small and the spring material is chosen properly, then the displacement can have a temperature coefficient that is close to zero. However, generally the thermal coefficient will be dominated by the elastic constant's thermal coefficient which is on the order of hundreds of parts per million. It is assumed that the coefficient is a few parts per million.

An approximate expression for the index of refraction of air is $$n = 1 + a\frac{P}{(T' + 273)} + bH_R(T'^2 + 160); \quad (14)$$

-continued $$a = 7.86 \times 10^{-4} \text{ K(kPa)}^{-1};$$

$$b = 1.5 \times 10^{-11} \text{ K(\%)}^{-1};$$

$H_R$ is the relative humidity in percent and T' is the temperature in centigrade. The first term is the ideal gas law inserted into the expression for the index of refraction as a function of density. At typical ambient conditions, the first term is approximately $2.7 \times 10^{-4}$. Or more simply, $$n = 1 + \xi N;$$

$$\xi = 1.092 \times 10^{-29} \text{ m}^3;$$

$$N = \text{Number Density } (1/\text{m}^3). \quad (15)$$

Because etalons for the optical control component of the locked light source and for the optical displacement sensor (e.g., a laser etalon) are separately hermetically sealed at their separate locations, the etalons for the light source and the sensor cavity reside in different hermetically sealed environments.

The density of a gas in a volume is given by the total number of molecules, $N_\#$ divided by the volume, V. Thus we have $$dN = \frac{\partial N}{\partial N_\#} dN_\# + \frac{\partial N}{\partial V} dV. \quad (16)$$

This is equal to zero, since $N_\#$ is fixed. Thus, $$\frac{dN}{dT} = \frac{\partial}{\partial V}\left(\frac{N_\#}{V_0}\right)\frac{dV}{dT} = -\frac{N_\#}{V_0^2}\frac{d}{dT}V_0(1 + 3C_{TE}(T - T_0)) \quad (17)$$

$$= -\frac{N_\#}{V_0} 3C_{TE} = -3C_{TE} N_0$$

where the subscript 0 refers to the volume at $T_0$, and $C_{TE}$ is the linear coefficient of thermal expansion. Thus the density is given by $$N = N_0(1 + 3C_{TE}(T - T_0)), \quad (18)$$

and the index of refraction is given by $$n = 1 + \xi N_0(1 + 3C_{TE}(T - T_0)); \quad (19)$$

$$= n_0 + 3\xi C_{TE} N_0 (T - T_0).$$

Thus, evaluating this expression for a cavity with a room temperature, room pressure gas, and aluminum container, $$\frac{\delta n}{n_0} \approx 3\xi C_{TE} N_0 \delta T \equiv C_T \delta T \quad (20)$$

$$\approx 3 \times (1.1 \times 10^{-29} [\text{m}^{+3}])(23 \times 10^{-6}[\text{K}^{-1}])(2.4 \times 10^{25}[\text{m}^{-3}])\delta T$$

$$\approx (1.85 \times 10^{-8} [\text{K}^{-1}])\delta T$$

Thus, regarding index of refraction, by regulating the temperature to changes of fewer than 0.5 degrees (and the housing has a $C_{TE}$ of less than ten ppm), a separate hermetically sealed enclosure for laser and sensor may used with acceptable results. However, with regards to angular stability, the angle of the light beams entering the cavity is small, less than 10-15 degrees. Using a Taylor expansion in temperature, we have $$\cos\theta \approx \cos\theta_0 (1 - C_T \theta_0^2 \delta T). \quad (21)$$

In this case, $C_T$ may be 5-15 ppm, and the angle less than 0.2 radians. Thus, acceptable results may be achieved if the temperature is maintained within 1 millikelvin.

However, in light of the difference in environment between the sensor module and the light source module, achieving the desired degree of precision becomes problematic. Repeating equation (10), $$\delta_C = 2\pi\alpha \frac{(x_C \pm x) n_C \cos\theta_C}{d_L n_L \cos\theta_L}. \quad (22)$$

Substituting in all the thermal coefficients and keeping only the linear terms, $$\frac{n_C \cos\theta_C}{d_L n_L \cos\theta_L}(x_C \pm x) \approx \left(\frac{n_C \cos\theta_C}{d_L n_L \cos\theta_L}(x_C \pm x)\right)_0 \quad (23)$$
$$\left[1 + \left(C_{T,n_C} + C_{T,\theta_C} + \frac{x_C}{(x_C \pm x)}C_{T,x_C} \pm \frac{x}{(x_C \pm x)}C_{T,x}\right)\delta T_C - (C_{T,n_L} + C_{T,\theta_L} + C_{T,d_L})\delta T_L\right]$$

where the zero subscript refers the value at the mean temperature of each etalon. Given the conclusion of Index of Refraction section, the temperature coefficients of the index of refraction may be ignored.

$$\frac{n_C \cos\theta_C}{d_L n_L \cos\theta_L}(x_C \pm x) \approx \left(\frac{n_C \cos\theta_C}{d_L n_L \cos\theta_L}(x_C \pm x)\right)_0 \quad (24)$$
$$\left[1 + \left(C_{T,\theta_C} + \frac{x_C}{(x_C \pm x)}C_{T,x_C} \pm \frac{x}{(x_C \pm x)}C_{T,x}\right)\delta T_C - (C_{T,\theta_L} + C_{T,d_L})\delta T_L\right]$$

By inspection we can write down the error associated with the fluctuation in temperature.

$$\frac{\sigma_{\delta_C}^2}{(2\pi\alpha)^2} = \left(\frac{n_C \cos\theta_C}{d_L n_L \cos\theta_L}(x_C \pm x)\right)_0^2 \quad (25)$$
$$\left[\left(C_{T,\theta_C} + \frac{x_C}{(x_C \pm x)}C_{T,x_C} \pm \frac{x}{(x_C \pm x)}C_{T,x}\right)^2 \delta T_C^2 + (C_{T,\theta_L} + C_{T,d_L})^2 \delta T_L^2\right]$$

Thus, the errors in the laser add to the errors in the sensor because fluctuations in the temperature at each module are uncorrelated.

Figure 8:
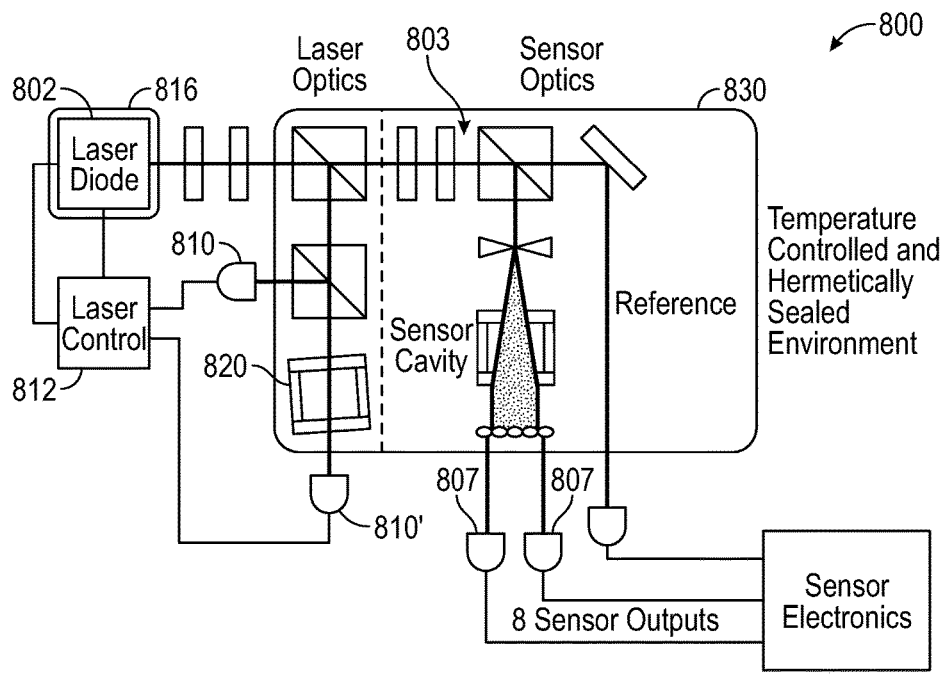
FIG. 8 shows another example optical displacement sensor with a locked wavelength light source.

FIG. 8 shows another example optical displacement sensor with a locked wavelength light source. The optical displacement sensor includes an optical displacement device for measurement of the parameter of interest, and a closed loop light source control including an optical component at the optical displacement device. The closed loop light source control is configured to compensate for changes in temperature at the optical displacement device by adjusting the at least one light source.

In the apparatus of FIG. 8, the temperature and pressure sensitive devices (e.g., the locking etalon and sensor etalon) of the laser system and the sensor are combined in a single housing 830. This means that the temperature of the laser etalon and sensor etalon are equal; their gas pressures are equal; and their gas compositions are equal. Furthermore, any fluctuations in the properties of the cavities are correlated. The housing 830 may also be hermetically sealed. In some embodiments, the components are configured for free space transmission of the beam. Thus, polarization maintaining fiber may be altogether eliminated, thereby avoiding fluctuations in laser light polarization inherent in fiber.

The optical displacement device 800 includes a number of free space optical components including a laser diode 802 and a closed loop light source control. The closed loop light source control includes an optical control component (locking etalon 820), one or more detectors (photodiode 810') optically coupled to the optical control component, and control electronics (laser control module 812) operatively coupled to the at least one detector and laser diode 802. The optical displacement device 800 also includes a thermoelectric cooler ('TEC') 816 to regulate the temperature of the laser diode 802. The optical displacement device 800 further includes sensor optics 803, detectors 807, and an optical displacement device (sensor etalon 805).

For optical displacement device 800, the sensor cavity temperature and the laser locking etalon temperatures may be equated.

$$\frac{n_C \cos\theta_C}{d_L n_L \cos\theta_L}(x_C \pm x) \approx \left(\frac{n_C \cos\theta_C}{d_L n_L \cos\theta_L}(x_C \pm x)\right)_0 \quad (26)$$
$$\left[1 + \left(C_{T,\theta_C} + \frac{x_C}{(x_C \pm x)}C_{T,x_C} \pm \frac{x}{(x_C \pm x)}C_{T,x} - C_{T,\theta_L} - C_{T,d_L}\right)\delta T_C\right]$$

The sensor cavity and the laser etalon may be manufactured from matching materials, resulting in their coefficients of thermal expansion being equal, other than differences caused by the pieces being exposed to slightly manufacturing processes (different batches). That is, the optical phase of the sensor signals are independent of the thermal expansion of the both the laser etalon and sensor cavity provided the coefficients of thermal expansion are matched. Thus, $$\frac{n_C \cos\theta_C}{d_L n_L \cos\theta_L}(x_C \pm x) \approx \left(\frac{n_C \cos\theta_C}{d_L n_L \cos\theta_L}(x_C \pm x)\right)_0 \quad (27)$$
$$\left[1 + \left(C_{T,\theta_C} - C_{T,\theta_L} \pm \frac{x}{(x_C \pm x)}(C_{T,x} - C_{T,x_C})\right)\delta T_C\right]$$

This eliminates the error caused by thermal fluctuations in the length of the laser etalon and sensor cavity lengths. Furthermore, if the thermal coefficient of the etalon is also matched to that of the spring, there is a further reduction in the temperature sensitivity of the device. The optical phases of the sensor signals are independent of the thermal coefficient of the spring constant of the proof-mass spring assembly. In any case, holding the laser wavelength over the long term is no longer necessary. In the ideal case, the above equation reduces to $$\frac{n_C \cos\theta_C}{d_L n_L \cos\theta_L}(x_C \pm x) \approx \left(\frac{\cos\theta_C}{d_L \cos\theta_L}(x_C \pm x)\right)_0 (1 + (C_{T,\theta_C} - C_{T,\theta_L})\delta T_C), \quad (28)$$

and the error depends only on the fluctuations in a single temperature (e.g., the temperature at the sensor etalon).

Figure 9A:
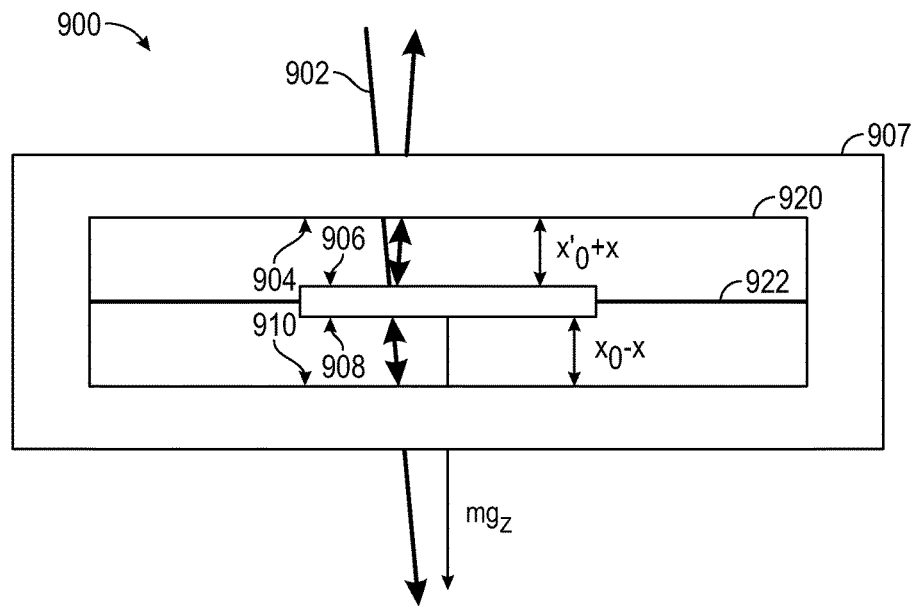
FIGS. 9A and 9B show an illustrative gravimeter having an optical displacement device with two Fabry-Perot cavities in accordance with embodiments of the present disclosure.
Figure 9B:
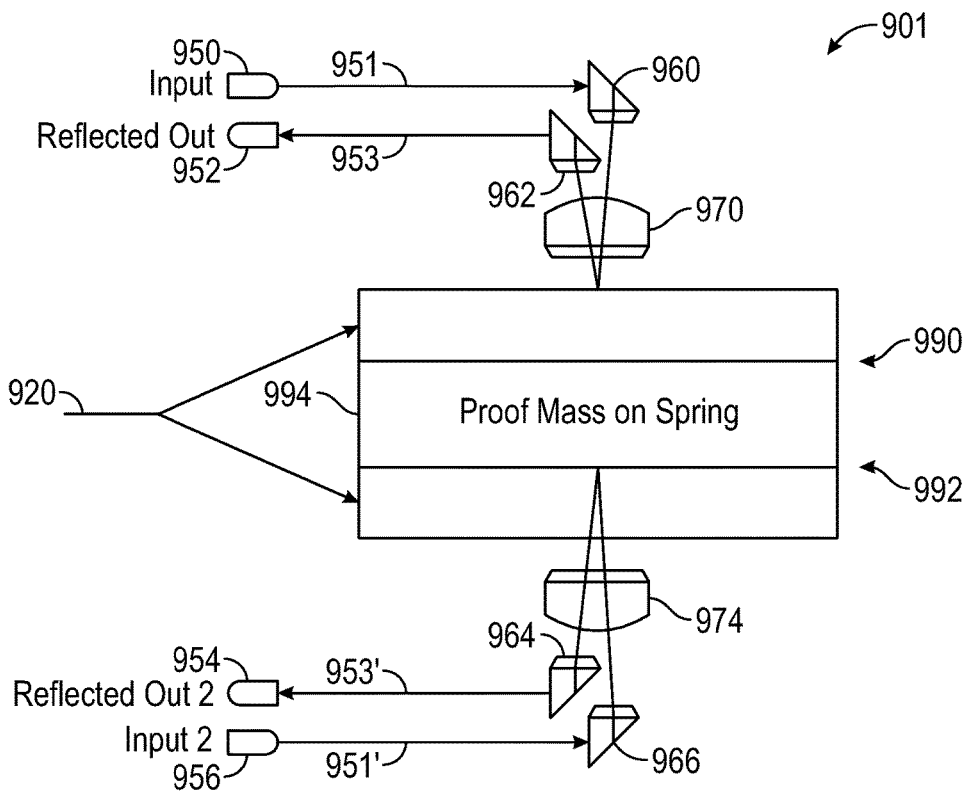

FIGS. 9A and 9B show an illustrative gravimeter having an optical displacement device with two Fabry-Perot cavities in accordance with embodiments of the present disclosure. Referring to FIG. 9A, the optical displacement device 900 is configured to receive at least one electromagnetic beam 902 and includes a first reflective surface 904; a second reflective surface 906; a third reflective surface 908; and a fourth reflective surface 910. The third reflective surface 908 may be fixed with respect to the second reflective surface 906 and the fourth reflective surface 910 may be fixed with respect to the first reflective surface 904.

A lower optical cavity is formed by third reflective surface 908 and fourth reflective surface 910. The third reflective surface 908 may be attached to the frame 920 via a spring 922 with a spring constant k. An upper optical cavity is formed by first reflective surface 904 and second reflective surface 906. The second reflective surface 906 may also be attached to the frame 920 via a spring 922 with a spring constant k. The second and third reflective surfaces may be formed as a two-sided mirror 907 by applying a coating to opposing sides of a solid member. The solid member may function as the proof mass. This configuration results in a first variable gap between the first reflective surface and the second reflective surface; and a second variable gap between the third reflective surface and the fourth reflective surface.

Supposing that the output of identical sensors may be generally expressed as $$s = a g_z + b \quad (29)$$

where s is the output, $g_z$ is the component of gravity perpendicular to the sensor's sensitive axis, and a and b are the linear constants of the sensor that may be time and temperature dependent. In optical displacement device 900, where the two sensors are anti-parallel, the output of the sensors may be expressed respectively as $$s' = a' g_z + b', \text{ and}$$

$$s = -a g_z + b \quad (30)$$

In the case of identical sensors, the linear constants are identical, and $$s' - s = 2 a g_z, \text{ and}$$

$$s' + s = 2b. \quad (31)$$

Thus the differential signal has a zero offset and the total signal is just twice the value of each sensor's offset. In the case of the optical sensor, after sufficient signal processing, the produced signal is the length of the Fabry-Perot cavity. The two-sided mirror 907 deflects when a force is applied by an amount x given by $$kx = m g_z \quad (32)$$

where m is the mass of the two-sided mirror/spring system. If the cavity length is $x_0$ when zero force is applied, then the signal measured by the system is $$s = x_0 - x = x_0 - (m/k) g. \quad (33)$$

Relating this back to equation (29), we can identify $$a = -(m/k); \; b = x_0. \quad (34)$$

Light reflected between the first and second reflective surfaces may be described in a related way, such that the second cavity responds identically to the first cavity except that displacement of the mirror is in the opposite direction. Thus, we have $$s' = x'_0 + x = x'_0 + (m/k) g. \quad (35)$$

The cavities are of different lengths. However, the constant for the linear term is identical to the second cavity. Thus the signal sum and difference may be expressed as $$s' - s = 2(m/k) g_z + (x'_0 - x_0), \text{ and}$$

$$s' + s = 2(x'_0 + x_0). \quad (36)$$

Inverting eqn. (36) for the component of gravity, we find the estimate for the gravity component as $$\hat{g}_z = \frac{\omega_0^2 \Delta s}{2} - \frac{\omega_0^2 \Delta x_0}{2} = \alpha_d \Delta s - \beta_d; \quad (37)$$

$$\Delta s = s' - s; \; \Delta x_0 = x'_0 - x_0; \; \omega_0 = \sqrt{k/m}.$$

Here, $\alpha$ and $\beta$ are used for the coefficients of the gravity estimator. The equivalent equations for the lower and upper cavities respectively are $$\hat{g}_z = \omega_0^2 s + \omega_0^2 x_0 = \alpha s + \beta;$$

$$\hat{g}_z = \omega_0^2 s' + \omega_0^2 x_0' = -\alpha' s' + \beta'. \quad (38)$$

When comparing the baseline offset terms ($\beta$) in eqns. (37) and (38), it is readily apparent that the offset term for the differential measurement can, in principle, be set to zero by making the initial cavity lengths of the two cavities equal, thereby approximating a zero-length spring. In practice, the term may be reduced to the tolerance to which the cavities lengths are manufactured.

Using currently available technology, the apparatus may be configured to maintain a constant etalon temperature to ±1 mK and the cavities have a tolerance of 25 micrometers. However, the cavities in a dual cavity system may be designed to be of equal length when the gravitational force on the proof-mass is zero, resulting in minimum value of offset that is limited only by manufacturing tolerance. For a dual cavity system, the difference in cavity lengths (and thus, the relevant offset term) could be approximately 10 nanometers or less. So the process reduces the offset term by a factor of $10^{-4}$ over a single cavity sensor with a 100 micrometer cavity. In addition, if the spacers for each cavity were manufactured from the same material and lot, the thermal expansion of each might only differ by 1 percent ($\delta \varepsilon_{x0} \approx 0.01 \; \varepsilon_{x0}$).

Moreover, the offset term in eqn. (37) is much smaller than those in eqn. (38) because the tolerance is usually much smaller than the actual dimension. If t is the tolerance then the offset term may be reduced by $$\beta_d / \beta = t / x_0. \quad (39)$$

The temperature dependence of the linear term depends on the spring constant k and thermal expansion of the cavities. The change in offset is $$\delta \beta_d / \delta T = \beta_d (\varepsilon_Y + \varepsilon_L + \varepsilon_{x0}) + (\omega_0^2 x_0' / 2) \delta \varepsilon_{x0}, \quad (40)$$

where $\varepsilon$ is the temperature coefficient and the subscript indicates the corresponding property. The subscript Y is for Young's modulus, L is for spring length, and $x_0$ is for cavity length. The first term is the regular expression for the temperature dependence of the offset term and is the same as it would be for an individual measurement. The second term indicates that the coefficients of expansion for the cavity lengths may not be identical. When compared to the thermal dependence of a single cavity device, we find $$\delta\beta_d/\delta T \approx \beta\left[\frac{t}{2x_0'}(\varepsilon_Y + \varepsilon_L + \varepsilon_{x0}) + \delta\varepsilon_{x0}\right] << \delta\beta/\delta T. \quad (41)$$

The thermal dependence of the proportionality constant is $$\delta\alpha_d/\delta T = \alpha_d(\varepsilon_Y + \varepsilon_L), \quad (42)$$

and is identical to a single cavity device. The thermal coefficient for Young's modulus for many materials is −100 ppm while the coefficient of thermal expansion is on the order of a few parts per million. However there are several materials for which eqn. (42) is approximately zero. Two of these have coefficients of thermal expansion of 4.5 to 6.5 ppm and 8.0 ppm from room temperature to 300 C. For these to satisfy eqn. (42), the thermal coefficient for Young's modulus is on the same order but negative. When eqn. (42) is zero, $$\delta\beta_d/\delta T = \beta_d\varepsilon_{x0} + (\omega_0^2 x_0'/2)\delta\varepsilon_{x0}. \quad (43)$$

For a nominal cavity length of 100 um, the thermal coefficient for the estimate of gravity is $$\frac{d}{dT}\hat{g}_z = \frac{d}{dT}(\alpha_d\Delta s + \beta_d)$$

$$= \left(\varepsilon(\alpha_d)\alpha_d\Delta s + \beta_d\varepsilon_{x0} + \frac{\omega_0^2 x_0'}{2}\delta\varepsilon_{x0}\right)$$

$$\approx \left(\beta_d + 0.01\frac{\omega_0^2 x_0'}{2}\right)\varepsilon_{x0}$$

$$\approx (5\times10^{-6})\frac{(2\pi 100)^2}{2}(10\times10^{-9} + 0.01(100\times10^{-6}))$$

$$= 9.8\times10^{-7} \text{ m/s}^2\text{-K}$$

Thus we have $$\sigma_{\hat{g}_z} = (9.86\times10^{-7} \text{ m/s}^2\text{-K})\sigma_T \approx 1\times10^{-9} \text{ m/s}^2 \quad (44)$$

For a single-sided sensor with a nominal cavity length of 100 um, multiply by 4 and we have $\sigma_{\hat{g}_z} \approx 0.1$ uGal. Further improvements could be made by using zerodur or other low thermal expansion materials.

Assuming that the sensitive axis of the differential sensor is parallel to gravity (the 'up' orientation), and that a rotation of the sensor 180 degrees about an axis perpendicular to the sensitive axis is the 'down' position, $$\Delta s_+ = (s'-s)_+ = 2\omega_0^{-2}g + \Delta x_0, \text{ and}$$

$$\Delta s_- = (s'-s)_- = -2\omega_0^{-2}g + \Delta x_0, \quad (45)$$

then $$\Delta s_+ - \Delta s_- = -4\omega_0^{-2}g; \text{ and}$$

$$\Delta s_+ + \Delta s_- = 2\Delta x_0. \quad (46)$$

Combining this with the sum of the signals, it is possible to solve for the initial lengths of the two cavities.

$$2\langle s\rangle_\pm = x_0' + x_0;$$

$$2\langle \Delta s_\pm\rangle = 2(x_0' - x_0). \quad (47)$$

Solving for the cavity lengths, $$x_0' = \langle s\rangle_\pm + \frac{1}{2}\langle \Delta s_\pm\rangle;$$

$$x_0 = \langle s\rangle_\pm - \frac{1}{2}\langle \Delta s_\pm\rangle. \quad (48)$$

In some embodiments, it is further possible to apply a small acceleration to the frame with a frequency below the resonant frequency of the proof-mass and spring assembly, for example, by using an actuator (e.g., mechanical, piezo-electric, magnetic, etc.). The acceleration may be modeled as $$a(t) = \alpha_0\cos\omega t; \omega << \omega_0 \quad (49)$$

Then in addition the possibly large component of gravity we have a small amplitude signal. At the minimum and maximum amplitudes of the small signal, we have $$\Delta s_{+\alpha} = 2\omega_0^{-2}(g_z + \alpha_0) + \Delta x_0, \text{ and}$$

$$\Delta s_{-\alpha} = 2\omega_0^{-2}g(g_z - \alpha_0) + \Delta x_0. \quad (50)$$

Then $$\Delta s_{+\alpha} - \Delta s_{-\alpha} = -4\omega_0^{-2}\alpha_0. \quad (51)$$

Thus, in calibrating the dual cavity device, a greatly reduced offset term may be achieved in relation to conventional optical displacement devices.

FIG. 9B shows another gravimeter having an optical displacement device with two Fabry-Perot cavities in accordance with embodiments of the present disclosure. The optical displacement device 901 is configured to receive at least one separate corresponding electromagnetic beam 951, 951' for each cavity 990, 992. Each cavity 990, 992 is configured to output a separate corresponding electromagnetic beam (953, 953') eliminating any need for a transparent or translucent mirror incorporated in the proof mass 994. Thus, the two sided mirror may be opaque. In one example, the central member may be manufactured from Tungsten or a similarly dense material. The mass of the proof mass, therefore, may be significantly greater (keeping the dimensions fixed) than in the embodiment of FIG. 9A, resulting in greater precision in gravitational measurements. However, the use of separate inputs and outputs for each cavity may increase design complexity and require additional space, thus making the choice between embodiments according to FIG. 9A and FIG. 9B application specific and dependent upon a number of design considerations.

Input beams 951, 951' and output beams 953, 953' may be configured using light input components 950, 956 (which may be light sources, intermediate optics, or optical fiber); and light output detection components (which may be light sensors, intermediate optics, or optical fiber); and associated optical components 960-974.

Figure 10:
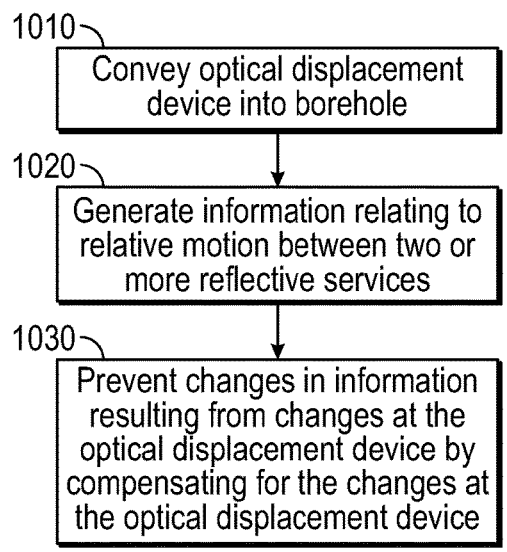
FIG. 10 shows a flow chart of a method for estimating a parameter of interest in an earth formation intersected by a borehole according to one embodiment of the present disclosure.

FIG. 10 shows of flow chart of a method 1000 for estimating a parameter of interest in an earth formation intersected by a borehole according to one embodiment of the present disclosure. The method 1000 may include using devices 100, 800, 900, 901, and so on. In step 1010, an optical displacement device is conveyed into the borehole 12. For example, the optical displacement device may be conveyed using conveyance device (or carrier) 14. The optical displacement device may be incorporated as an instrument in a downhole logging tool.

In step 1020, the optical displacement device is used to generate information from the optical displacement device relating to relative motion between two or more reflective surfaces of the optical displacement device that is indicative of the parameter of interest. For example, a plurality of light beams 880 may be transmitted into an etalon 445 and partially transmitted from the etalon 445 to a detector array 860. An external stimulus (such as force or acceleration) causes a displacement in one of the mirrored surfaces of the etalon 445, which changes the cavity length of the etalon 445. Electrical signals generated by the detector array 860 due to the partially transmitted light beams may be altered as a result of change in cavity length of the etalon 445. The signals may carry (embody) the information. An external stimulus may be estimated based on the change in the electrical signals generated by the detector array 860. In some embodiments, the external stimulus estimation may also use a reference signal generated by a reference detector. In some embodiments, step 1020 may be performed with a single light beam that is moved through a range of angles of incidence over a period of time, such that the electrical signals generated may be produced sequentially.

In step 1030, the method includes preventing changes in the information resulting from changes at the optical displacement device in at least one of i) temperature, or ii) pressure, by compensating for the changes at the optical displacement device. Compensating may be carried out by adjusting at least one light source generating an electromagnetic beam (at least partly received by the optical displacement device, the adjusting responsive to information relating to a control optical displacement device (e.g., locking etalon 720) at the optical displacement device. For example, adjusting the at least one light source may be carried out using at least one detector optically coupled to the control optical displacement device; and control electronics operatively coupled to the at least one detector and the at least one light source and configured to provide closed loop control of the at least one light source using information from the at least one detector. Alternatively, compensating may be carried out by using an optical displacement device including a first reflective surface; a second reflective surface; a third reflective surface fixed with respect to the second reflective surface; a fourth reflective surface fixed with respect to the first reflective surface; a first variable gap between the first reflective surface and the second reflective surface; and a second variable gap between the third reflective surface and the fourth reflective surface; and by configuring the optical displacement device such that the difference between the first variable gap and the second variable gap is substantially zero while the apparatus is subject to nominal conditions.

Displacement as used herein means change in position over time. Displacement may include relative displacement (e.g., displacement of a member relative to a sensor, another member, or the rest of the device) or absolute displacement (e.g., displacement relative to the earth).

The term "carrier" as used herein means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Exemplary non-limiting conveyance devices include drillstrings of the coiled tube type, of the jointed pipe type and any combination or portion thereof. Other conveyance device examples include casing pipes, wirelines, wire line sondes, slickline sondes, drop shots, downhole subs, BHA's, drillstring inserts, modules, internal housings and substrate portions thereof, and self-propelled tractors.

The term "information" as used above includes any form of information (analog, digital, EM, printed, etc.). Herein, the term "information" may include one or more of: raw data, processed data, and signals. The term "processor" herein includes, but is not limited to, any device that transmits, receives, manipulates, converts, calculates, modulates, transposes, carries, stores or otherwise utilizes information. In embodiments, the processor may be configured to include resident memory (and/or peripherals) operatively coupled to the processor, so as to be accessible to the processor for executing programmed instructions. In several non-limiting aspects of the disclosure, a processor may be embodied as a computer that executes programmed instructions for performing various methods. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

By an offset value of "substantially zero" for the difference in cavity length under nominal conditions, it is meant a distance of zero allowing for manufacturing tolerances currently practical for Fabry-Perot etalons manufactured for downhole use, examples of such a distance including, for example, less than 100 nm, less than 50 nm, less than 20 nm, less than 10 nm, less than 5 nm, less than 3 nm, and so on, down to and including zero distance. Herein, environmental conditions "at" a component of a sensor refer to conditions at a location sufficiently close to the component such that any differences in conditions are indistinguishable on the use of the sensor in estimating a parameter of interest of the borehole, examples of such a distance including, for example, less than 1 meter, less than 20 centimeters, less than 10 centimeters, less than 5 centimeters, less than 3 centimeters, and so on, down to and including zero distance. Temperature at the optical displacement device may also be defined as temperature at a location sufficiently close to the optical displacement device so as to deviate from the environmental temperature of the sensor cavity of the optical displacement device by less than 1 percent, 0.5 percent, 0.2 percent, 0.1 percent, 0.01 percent, or less; or a temperature at a location sufficiently close to the optical displacement device so as to deviate from the environmental temperature of the sensor cavity such that measurement error of the sensor due to offset is less than 1, 0.5, 0.2, 0.1, or 0.01 percent.

Certain embodiments of the present disclosure may be implemented with a hardware environment that includes a processor, an information storage medium, an input device, processor memory, and may include peripheral information storage medium. The hardware environment may be in the well, at the rig, or at a remote location. Moreover, the several components of the hardware environment may be distributed among those locations. The input device may be any data reader or user input device, such as data card reader, keyboard, USB port, etc. The information storage medium stores information provided by the detectors. Information storage medium may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium stores a program that when executed causes information processor to execute the disclosed method. Information storage medium may also store the formation information provided by the user, or the formation information may be stored in a peripheral information storage medium, which may be any standard computer information storage device, such as a USB drive, memory stick, hard disk, removable RAM, or other commonly used memory storage system known to one of ordinary skill in the art including Internet based storage. Information processor may be any form of computer or mathematical processing hardware, including Internet based hardware. When the program is loaded from information storage medium into processor memory (e.g. computer RAM), the program, when executed, causes information processor to retrieve detector information from either information storage medium or peripheral information storage medium and process the information to estimate a parameter of interest. Information processor may be located on the surface or downhole.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

While the foregoing disclosure is directed to the one mode embodiments of the disclosure, various modifications will be apparent to those skilled in the art. It is intended that all variations within the scope of the appended claims be embraced by the foregoing disclosure.

We claim:

1. An apparatus for estimating a parameter of interest, comprising:
    an optical displacement sensor comprising:
        a light source configured to generate an initial electromagnetic beam;
        an optical displacement device configured to receive at least one electromagnetic beam comprising at least a portion of the initial electromagnetic beam;
        at least one detector configured to receive a part of the at least one electromagnetic beam received by the optical displacement device and provide information relating to the parameter of interest; and
        a closed loop light source control comprising an optical component proximate the optical displacement device such as to experience the same temperature and pressure as the optical displacement device, the closed loop light source control configured to compensate for changes in temperature at the optical displacement device by adjusting the light source.

2. The apparatus of claim 1, further comprising:
    a housing enclosing the optical displacement device and the optical component.

3. The apparatus of claim 2, wherein the housing is environmentally sealed.

4. The apparatus of claim 3, the housing maintains a vacuum inside the housing.

5. The apparatus of claim 1, wherein the optical component comprises:
    a beam splitter configured to divide the initial electromagnetic beam into the at least one electromagnetic beam and at least one second electromagnetic beam; and
    a control optical displacement device configured to receive the at least one second electromagnetic beam.

6. The apparatus of claim 5, further comprising:
    at least one detector optically coupled to the optical component and configured to receive a part of the at least one second electromagnetic beam; and
    control electronics operatively coupled to the at least one detector and the light source and configured to provide closed loop control of the light source using information from the at least one detector.

7. The apparatus of claim 1, wherein the optical displacement device comprises an etalon.

8. A method for estimating a parameter of interest in an earth formation intersected by a borehole, the method comprising:
    conveying an optical displacement device into the borehole, the optical displacement device being part of an optical displacement sensor;
    using a light source of the optical displacement sensor to generate an initial electromagnetic beam;
    generating measurement information using an optical displacement device receiving at least one electromagnetic beam comprising at least a portion of the initial electromagnetic beam;
    using at least one detector to receive a part of the at least one electromagnetic beam received by the optical displacement device and provide information relating to the parameter of interest; and
    using a closed loop light source control comprising an optical component proximate the optical displacement device such as to experience the same temperature and pressure as the optical displacement device to compensate for changes in temperature at the optical displacement device by adjusting the light source.

9. The method of claim 8, further comprising:
    enclosing the optical displacement device and the optical component in a housing.

10. The method of claim 9, wherein the housing is environmentally sealed.

11. The method of claim 10, comprising maintaining a vacuum inside the housing.

12. The method of claim 8, comprising:
    dividing the initial electromagnetic beam into the at least one electromagnetic beam and at least one second electromagnetic beam; and
    receiving the at least one second electromagnetic beam with a control optical displacement device.

13. The method of claim 12, further comprising:
    detecting a part of the at least one second electromagnetic beam at the optical component to generate control information; and
    providing closed loop control of the light source using the control information.

14. The method of claim 13, wherein providing closed loop control comprises:
    preventing changes in the measurement information resulting from changes at the optical displacement device in at least one of i) temperature, or ii) pressure, by adjusting the light source to compensate for the changes at the optical displacement device.

15. A method for estimating a parameter of interest in an earth formation intersected by a borehole, the method comprising:
    conveying an optical displacement device in the borehole;
    generating information from the optical displacement device relating to relative motion between two or more reflective surfaces of the optical displacement device that is indicative of the parameter of interest; and
    preventing changes in the information resulting from changes at the optical displacement device in at least one of i) temperature, or ii) pressure, by compensating for the changes at the optical displacement device, by adjusting a light source generating an electromagnetic beam at least partly received by the optical displacement device, the adjusting responsive to information relating to a control optical displacement device proximate the optical displacement device such as to experience the same temperature and pressure as the optical displacement device.

\* \* \* \* \*